US006794647B2

(12) United States Patent
Farnsworth et al.

(10) Patent No.: US 6,794,647 B2
(45) Date of Patent: Sep. 21, 2004

(54) MASS ANALYZER HAVING IMPROVED MASS FILTER AND ION DETECTION ARRANGEMENT

(75) Inventors: Vincent R. Farnsworth, Agoura, CA (US); John R. Fassett, Minneapolis, MN (US)

(73) Assignee: Beckman Coulter, Inc., Fullerton, CA (US)

( * ) Notice: Subject to any disclaimer, the term of this patent is extended or adjusted under 35 U.S.C. 154(b) by 0 days.

(21) Appl. No.: 10/374,771

(22) Filed: Feb. 25, 2003

(65) Prior Publication Data

US 2004/0164241 A1 Aug. 26, 2004

(51) Int. Cl.[7] ................................................ B01D 59/44
(52) U.S. Cl. ....................................................... 250/293
(58) Field of Search ................................ 250/292, 288, 250/281, 309, 492.21

(56) References Cited

U.S. PATENT DOCUMENTS

| | | | | |
|---|---|---|---|---|
| 3,136,888 A | | 6/1964 | Andras et al. | |
| 3,239,662 A | | 3/1966 | Noller | |
| 3,555,271 A | | 1/1971 | Brubaker et al. | |
| 3,925,663 A | | 12/1975 | Hiller et al. | |
| 3,970,849 A | | 7/1976 | Brongersma et al. | |
| 4,126,804 A | | 11/1978 | Asam et al. | |
| 4,208,582 A | | 6/1980 | Arnush et al. | |
| 4,221,964 A | | 9/1980 | Schlereth et al. | |
| 4,982,088 A | | 1/1991 | Weitekamp et al. | |
| 5,495,108 A | | 2/1996 | Apffel, Jr. et al. | |
| 5,514,868 A | * | 5/1996 | Dixon | 250/282 |
| 5,726,448 A | | 3/1998 | Smith et al. | |
| 5,886,346 A | | 3/1999 | Makarov | |
| 6,153,880 A | * | 11/2000 | Russ et al. | 250/292 |
| 6,410,914 B1 | | 6/2002 | Park et al. | |
| 6,433,494 B1 | | 8/2002 | Kulish et al. | |
| 6,521,887 B1 | * | 2/2003 | Funsten et al. | 250/287 |
| 6,545,268 B1 | * | 4/2003 | Verentchikov et al. | 250/287 |
| 2002/0079444 A1 | | 6/2002 | Senko | |

FOREIGN PATENT DOCUMENTS

| | | |
|---|---|---|
| WO | WO 95/00237 | 1/1995 |
| WO | WO 95/23018 | 8/1995 |
| WO | WO 92/01599 | 1/2002 |

OTHER PUBLICATIONS

Alber, G.M. and Marshall, A.G. Fourier, Transform Ion Cyclotron Resonance of Highly–charged Atomic Ions. Physica Scripta, vol. 46, pp. 598–602, 1992.

Campbell, Victoria, Guan, Ziqiang, Vartanian, Victor H. and Laude, David A., Cell Geometry Considerations for the Fourier Transform Ion Cyclotron Resonance Mass Spectrometry Remeasurement Experiment. Anal. Chem., vol. 67, pp. 514–518, 1991.

(List continued on next page.)

*Primary Examiner*—John R. Lee
*Assistant Examiner*—Johnnie L. Smith, II
(74) *Attorney, Agent, or Firm*—The Law Offices of Robert B. Polit; D. David Hill; William H. May

(57) ABSTRACT

An improved mass analyzer is set forth. In accordance with one embodiment, the mass analyzer employs a unique mass filter design that comprises an ion selection chamber in which ions are selected for detection based on their mass-to-charge ratio (m/Q) by subjecting them to a non-rotating, oscillating electric field that, ignoring any fringing effects, oscillates principally in a single coordinate plane (i.e., the y-z plane). The ions may be injected into the ion selection chamber at a significant angle with respect to the inlet of the chamber and in the single coordinate plane to raise the m/Q resolution to the desired level. In accordance with a further embodiment of the mass analyzer, an ion detection surface is arranged at the outlet of the ion selection chamber so that ions falling within a predetermined exit angle range are detected to the general exclusion of ions having other exit angles.

53 Claims, 5 Drawing Sheets

OTHER PUBLICATIONS

Caravatti, P. and Allemann, M., The 'Infinity Cell': A New Trapper–ion Cell with Radiofrequency Covered Trapping Electrodes for Fourier Transform Ion Cyclotron Resonance Mass Spectrometry. Organic Mass Spectrometry, vol. 26, pp. 514–518, 1991.

Grosshans, Peter B. and Shields, Patrick J., Comprehensive Theory of The Fourier Transform Ion Cyclotron Resonance Signal for All Ion Trap Geometrics. J. Chemical Physics, vol. 94(8), Apr. 15, 1991.

Grosshans, Peter B., Chen, Ruidan, Limbach, Patrick A. and Marshall, Alan G., Linear Excitation and Detection in Fourier Transform Ion Cyclotron Resonance Mass Spectrometry. International Journal of Mass Spectrometry and Ion Process, vol. 139, pp. 169–189, 1994.

Guan, Shenheng, Gorshkov, Michael V., Marshall, Alan G., Cicularly Polarized Quadrature Excitation for Fourier–Transform Ion Cyclotron Resonance Mass Spectrometry. Chemical Physical Letters, vol. 198, No. 1, 2, pp. 143–148, 1992.

Guan, Shenheng and Marshall, Alan G., Filar Ion Cyclotron Resonance Ion Trap: Spatially Multiplexed Dipolar and Quadrupolar Excitation for Simultaneous Ion Axialization and Detection. Rev. Sci. Instru., vol. 66(1), pp. 63–66, Jan. 1995.

Hatakeyama, Rikizo, Sato, Naoyuki and Sato, Noriyoshi, An Efficient Mass Separation by Using Traveling Waves With Ion Cyclotron Frequencies. Nuclear Instruments and Methods in Physics Research, vol. B70, pp. 21–25, 1992.

Hiroki, S., T. Abe and Murakami Y., Influence of the Fringing Field Length on the Separated $^4He/D^2$ Peak Shape of a High–Resolution Quadrupole Mass Spectrometer, International Journal of Mass Spectrometry and Ion Processes, vol. 136, pp. 85–89, 1994.

Limbach, Patrick L., Grosshans, Peter B. and Marshall, Alan G., Harmonic Enhancement of a Detected Ion Cyclotron Resonance Signal by Use of Segmented Detection Electrodes. International Journal of Mass Spectrometry and Ion Processes, vol. 123, pp. 43–47, 1993.

Marshall, Alan G. and Schweikhard, Lutz, Fourier Transform Ion Cyclotron Resonance Mass Spectrometry: Technique Developments. International Journal of Mass Spectrometry and Ion Processes, vol. 118/119, pp. 37–70, 1992.

Marto, Jarrod A., Marshall, Alan G. and Schweikhard, Lutz, A Two–Electrode Ion Trap for Fourier Transform Ion Cyclotron Resonance Mass Spectrometry. International Journal of Mass Spectrometry and Ion Processes, vol. 137, pp. 9–30, 1994.

Nikolaev, E.N., Frankevich, V.E. and Aberth, W., The Resolution Obtained From Low Energy Ion Scattering Using An Ion Cyclotron Resonance Spectrometer. International Journal of Mass Spectrometry and Ion Processes, vol. 130, pp. 9–14, 1994.

Sugihara, Ryo and Yamanaka, Kaoru, Nonlinear Ion Cyclotron Resonance in Electromagnetic Wave with Non–Uniform Amplitude. Journal of the Physical Society of Japan, vol. 63, No. 12, pp. 4386–4395, Dec. 1994.

Wang, Mingda and Marshall, Alan G., Laboratory–Frame and Rotating–Frame Ion Trajectories in Ion Cyclotron Resonance Mass Spectrometry. International Journal of Mass Spectrometry and Ion Processes, vol. 100, pp. 323–346, 1990.

Xiang, Xinzhen, Grosshans, Peter B. and Marshall, Alan G., Image Charge–Induced Ion Cyclotron Orbital Frequency Shift for Orthohombie and Cylindrical FT–ICR Ion Traps. International Journal of Mass Spectrometry and Ion Processes, vol. 125, pp. 33–43, 1993.

Fuerstenau, Stephen D. and Benner, Henry W., Mollecular Weight Determination of Magadelton DNA Electrospray Ions Using Charge Detection Time–Of–Flight Mass Spectrometry. Rapid Communication in Mass Spectrometry, vol. 9, pp. 11528–11538, 1995.

* cited by examiner

MASS ANALYZER HAVING IMPROVED MASS FILTER AND ION DETECTION ARRANGEMENT

FIELD OF THE INVENTION

The present invention is generally directed to mass analyzers. More particularly, the present invention is directed to a mass analyzer having an improved mass filter and/or ion detection arrangement.

BACKGROUND OF THE INVENTION

The characteristics of mass spectrometry have raised it to an outstanding position among the various analysis methods. It has excellent sensitivity and detection limits and may be used in a wide variety of applications, e.g. atomic physics, reaction physics, reaction kinetics, geochronology, biomedicine, ion-molecule reactions, and determination of thermodynamic parameters ($\Delta G^{\circ}_{f}$, $K_a$, etc.). Mass spectrometry technology has thus begun to progress very rapidly as its uses have become more widely recognized. This has led to the development of entirely new instruments and applications. However, development trends have gone in the direction of increasingly complex mass analyzer designs requiring highly specialized components and tight manufacturing tolerances. Additionally, significant advances toward miniaturization of mass analyzer components have not been truly realized.

One attempt to improve on existing mass analyzers is shown in U.S. Pat. No. 5,726,448, issued Mar. 10, 1998, to Smith et al. The '448 patent purportedly describes a mass analyzer having a mass filter chamber that employs a rotating RF electric field for ion sample separation. Rotation of the electric field is achieved through the use of at least four electrodes that operate in opposed parallel pairs. A first RF signal is applied to the first pair of parallel electrodes while a second RF signal is applied to the second pair of parallel electrodes. The first and second RF signals differ in phase by $\pi/2$ and thereby generate the desired field rotation.

Two mass analyzer embodiments are identified in the '448 patent. In the first embodiment, a mass filter chamber is used in which both the first and second electrode pairs are aligned along the same length of the mass filter chamber. In the second embodiment, the second electrode pair is displaced from the first electrode pair along the length of the mass filter chamber. In each embodiment, the electric field generated at the second electrode pair is out of phase by $\pi/2$ from the electric field generated at the first electrode pair so that the ions are acted upon by at least two distinct electric fields. Thus, at least two orthogonal electric fields are mandated for operation of each embodiment.

The ions reaching the outlet end of the mass filter chamber form a circle for each set of ions having a given mass-to-charge ratio, m/Q. It is this circular pattern that is analyzed to determine the characteristics of the sample. Accordingly, the ion detector described in the '448 patent is configured as a two-dimensional device array that must necessarily (and without option) provide and process two coordinate values for each impinging ion. As shown in FIG. 6 of the '448 patent, the ion detector is disposed immediately adjacent and coextensive with the ion outlet end of the mass filter chamber to ensure detection of substantially all of the ions exiting the mass filter chamber without further regard to their m/Q values.

The present inventors have recognized that existing mass spectrometer apparatus may be improved in a variety of manners. For example, decreased complexity of one or more components may be achieved by, for example, employing a single, non-rotating RF electric field in the mass filter. Alternatively, in lieu of, or in addition to the foregoing, improvements can be realized by developing unique ion detection arrangements that take advantage of predetermined ion exit angles from the mass filter of ions having selected m/Q values. Such improvements can be achieved while still maintaining or exceeding manufacturing, mass resolution, and/or mass sensitivity goals.

SUMMARY OF THE INVENTION

An improved mass analyzer is set forth. In accordance with one embodiment, the mass analyzer employs a unique mass filter design. The mass filter comprises an ion selection chamber in which sample ions are subject to an electric field for analysis. At least one pair of electrodes is disposed within the ion selection chamber. Each of the electrodes of the electrode pair may, for example, have a planar face. The electrodes may also be oriented in the ion selection chamber to place their planar faces parallel and opposite one another about a central axis. An RF signal generator is connected to the electrode pair to produce the electric field within the ion selection chamber. More particularly, the electrodes and RF signal generator cooperate to provide a non-rotating, oscillating electric field in the chamber that, ignoring any fringing effects, oscillates principally in a single coordinate plane (i.e., the y-z plane).

An ionizer/ion injector may be used to ionize sample analytes and inject such ions into the ion selection chamber. Preferably, the ion injector directs the ions toward the planar face of either or both electrodes of the electrode pair. Even more preferably, the ion injector is adapted to inject the ions at a substantial angle with respect to a further coordinate plane (i.e., the x-y plane) at the ion inlet of the ion selection chamber. Angles of at least 40° are preferred while angles of at least 60° are even more preferable.

In accordance with a further embodiment, the mass analyzer comprises an ionizer/ion injector, a mass filter and an ion detector. The mass filter is adapted to receive sample ions from the ionizer/ion injector and has an ion inlet and an ion outlet. The ion inlet of the mass filter is disposed proximate the ionizer/ion injector while the ion outlet constitutes an opening through which ions having a certain m/Q may pass. The ion detector is disposed proximate the ion outlet of the mass filter and is positioned to principally detect ions that exit substantially at a predetermined exit angle, $\theta_e$, from the ion outlet of the mass filter and to the general exclusion of ions having other exit angles.

DESCRIPTION OF A PREFERRED EMBODIMENT OF THE INVENTION

Figure 1:
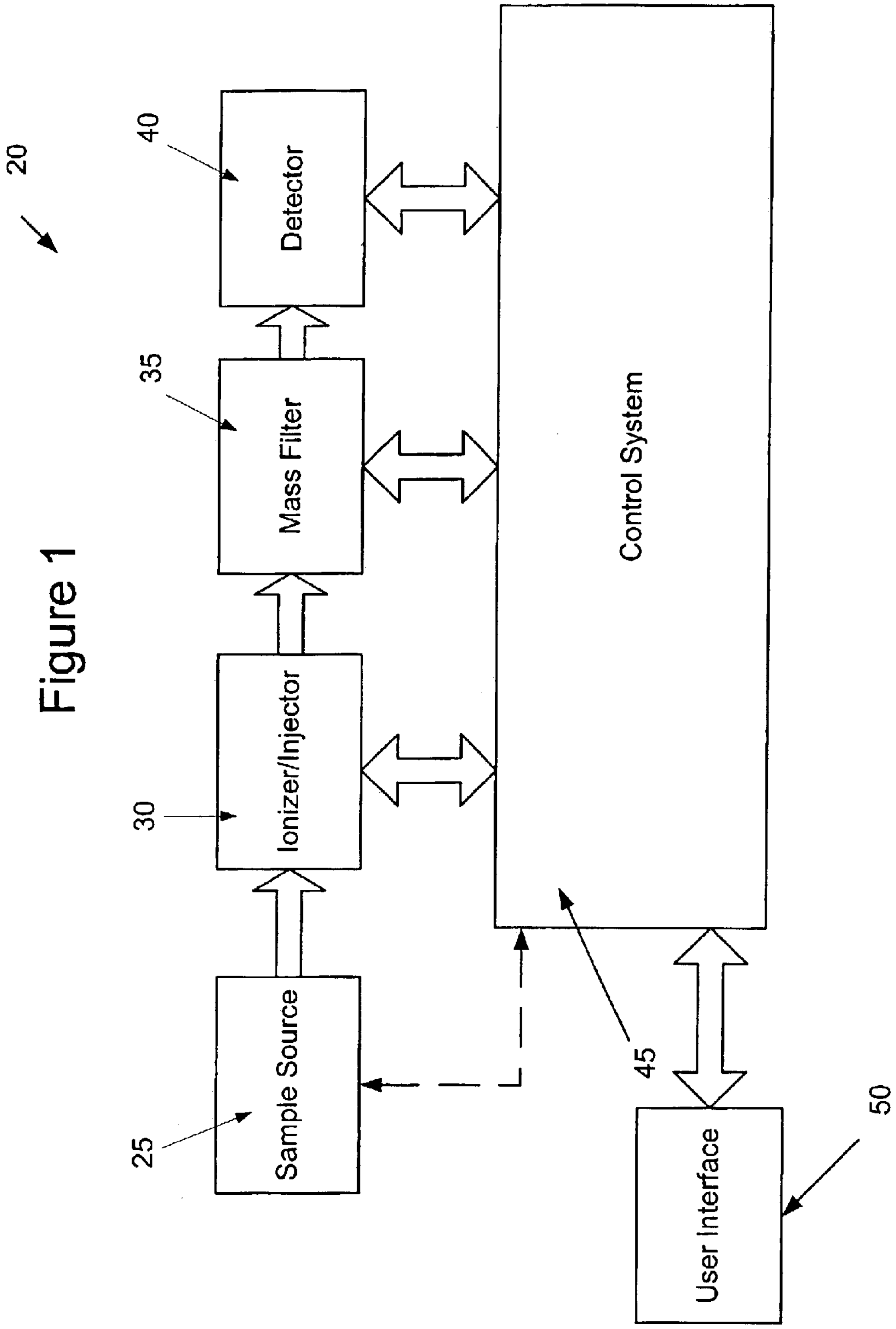
FIG. 1 is a block diagram of a mass analysis system constructed in accordance with one embodiment of the present invention.

The basic components of a mass analyzer constructed in accordance with one embodiment of the invention are shown in FIGS. 1 in block diagram form. As illustrated, the analyzer 20 includes a sample source 25, an ionizer/ion injector 30, a mass filter 35, and ion detector 40. The components of this mass analyzer 20 may be automated by one or more programmable control systems 45. For example, control system 45 may be used to execute one or more of the following automation tasks:

a) control of the ionization and ion injection parameters (i.e., ion beam focusing, ion beam entrance angle into the mass filter 35, ion injection timing, ionization energy, ion exit velocity, etc.);

b) control of the electric field parameters within the mass filter 35 to select only ions of a desired m/Q range for detection;

c) control of the position of the ion detection portions of the ion detector 40 with respect to the ion outlet of the mass filter 35 to facilitate detection of ions exiting the mass filter 35 at a predetermined exit angle, $\theta_e$, to the general exclusion of ions having other exit angles;

d) analysis of the data received from the mass analyzer 20 for presentation to a user or for subsequent data processing.

The parameters used to execute one or more of the foregoing automation tasks may be entered into the control system 45 by a human operator through, for example, user interface 50. Additionally, user interface 50 may be used to display information to the human operator for system monitoring purposes or the like. As such, user interface 50 may include a keyboard, display, switches, lamps, touch display, or any combination of these items.

The material that is to be analyzed is provided to analyzer 20 through the sample source unit 25. Sample source unit 25 can introduce the sample material (which includes the analyte) in several ways, the most common being with a direct insertion probe, or by infusion through a capillary column. The ionizer/ion injector 30 of the analyzer 20 is therefore adapted to interface directly with whatever form the sample takes at the output of the sample source unit 25. For example, it can be adapted to interface directly with the output of gas chromatography equipment, liquid chromatography equipment, and capillary electrophoresis equipment. It will be recognized that any treatment of the sample material prior to the point at which sample source unit 25 it is provided to the ionizer/ion injector 30 is dependent on the particular analysis requirements.

The ionizer/ion injector unit 30 operates to ionize the molecules of the analyte included in the received sample and to inject the ionized analyte molecules as a focused beam into the mass filter 35. The ionization and injection can be accomplished using any of a number of techniques. For example, one method that allows for the ionization and transfer of the sample material from a condensed phase to the gas phase is known as Matrix-Assisted Laser Desorption/Ionization (MALDI). Another technique is known as Fast Atom/Ion Bombardment (FAB), which uses a high-energy beam of Xe atoms, $Cs^+$ ions, or massive glycerol-$NH_4$ clusters to sputter the sample and matrix received from the sample source unit 25. The matrix is typically a non-volatile solvent in which the sample is dissolved. Although the ionization and ion injection processes of the illustrated embodiment are shown to occur in a single unit, it will be recognized that these processes can be executed in two or more separate units.

Figure 2:
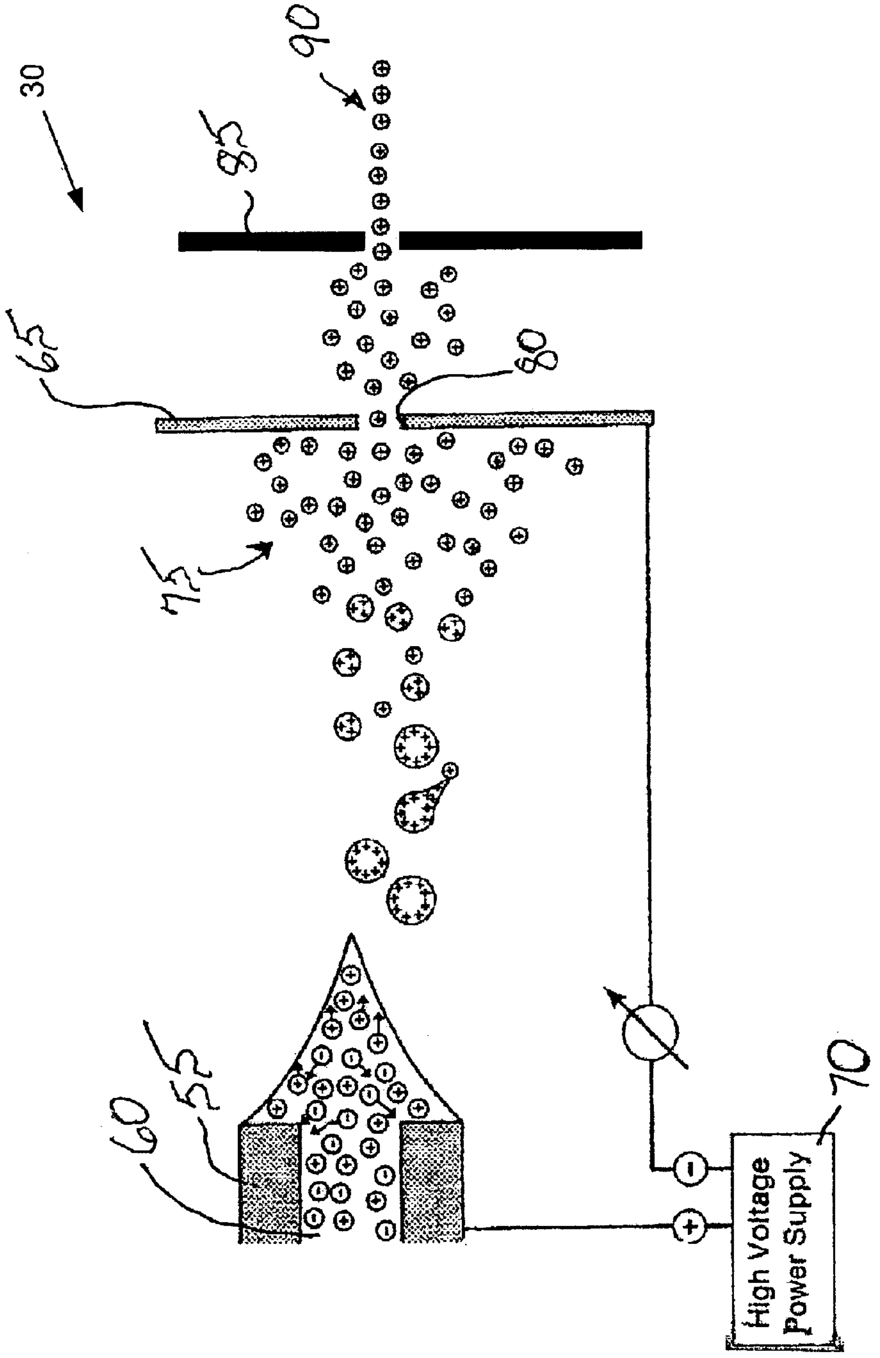
Figure 2 (Prior Art)
FIG. 2 is an illustration of one embodiment of an electrospray ionizer suitable for use in the mass analysis system shown in FIG. 1.

A still further technique that may be implemented by the ionizer/ion injector unit 30 to introduce the analyte into the mass filter 35 is electrospray ionization. One embodiment of a basic electrospray ionizer/ion injector unit 30 is shown in FIG. 2. As illustrated, the ionizer/ion injector unit 30 is comprised of a capillary tube having an electrically conductive capillary tip 55 through which a sample liquid 60 is provided for ionization and injection into the mass filter 35. The sample liquid 60 typically comprises a solvent containing an amount of the sample analyte. A counter-electrode 65 is disposed opposite the capillary tip 55 and an electric field is set-up between them by a power supply 70.

In operation, the electrically conductive capillary tip 55 oxidizes the solvent and sample analyte resulting in a meniscus of liquid that is pulled toward the counter-electrode 65. Small droplets of the liquid emerge from the tip of the meniscus and travel toward the counter-electrode 65. As the droplets make their way to the counter-electrode 65 under the influence of the electric field, the solvent tends to evaporate thereby leaving only charged gaseous ions 75 comprised of ionized analyte behind. A number of these charged gaseous ions 75 are accelerated through an orifice 80 in the counter-electrode 65 where a focusing lens 85 aligns them into a narrow ion beam 90. The narrow ion beam 90 is provided to the inlet of the mass filter unit 35 for separation of the ions based on their m/Q values.

Mass filter unit 35 operates as an ion filter based on the principles of the motion of charged particles in an electric field. The charged particles in the present case are ionized molecules with one or more net charges that are received from the ionizer/ion injection unit 35. The ion charges may be positive or negative. Ions entering the device are filtered according to their m/Q values. An ion of a particular m/Q will be detectable when the appropriate adjustable instrument parameters are set to allow passage of the ion through the mass filter 35 for impact with ion detection portions of the ion detector 40.

Figure 3:
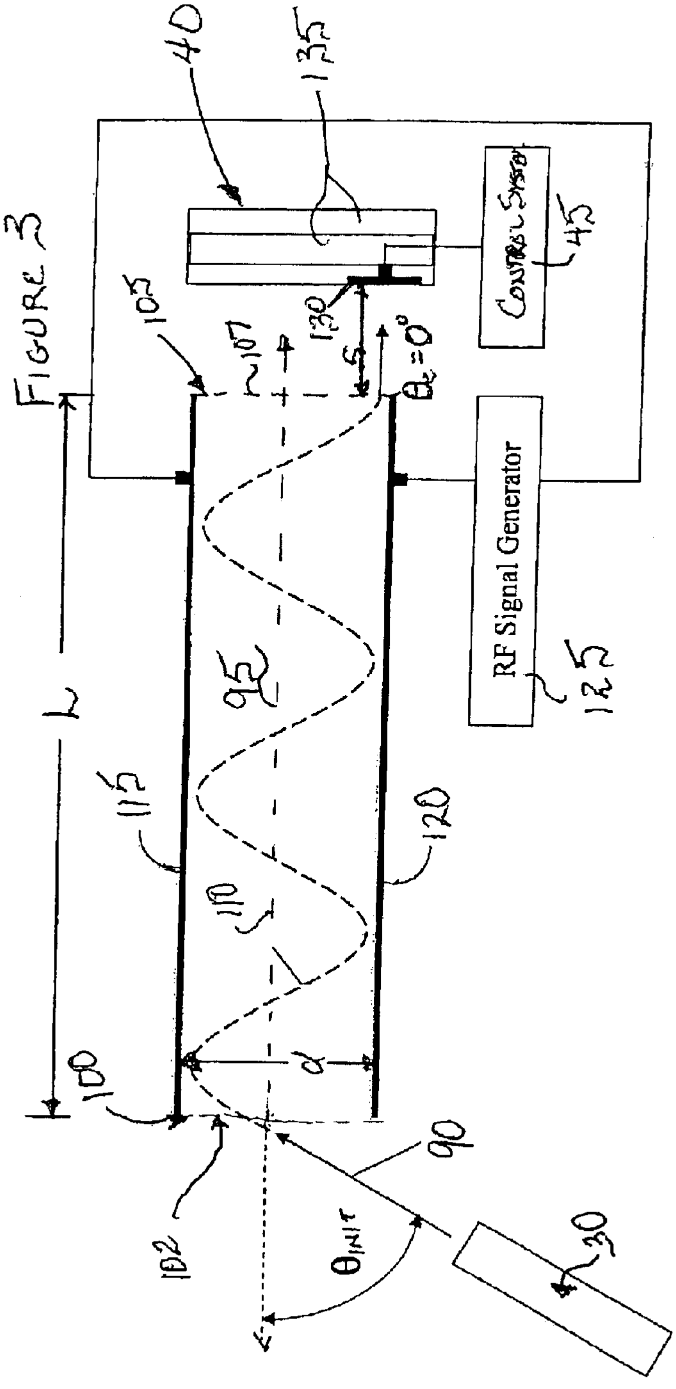
FIG. 3 is a side plan in view of selected portions of one embodiment of the mass analyzer of FIG. 1.
Figure 4:
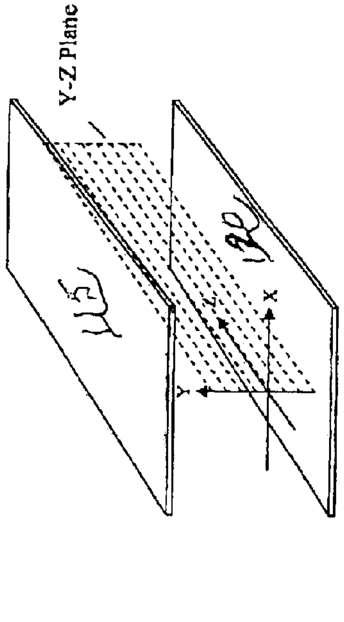
FIG. 4 is a perspective view of an orthogonal coordinate system that may be used to describe the arrangement of the components of the embodiment shown in FIG. 3 and their corresponding operation.

An embodiment of a mass filter unit 35 constructed in accordance with one aspect of the present invention is illustrated in FIG. 3. For illustration purposes, the orthogonal x, y, z coordinate system of FIG. 4 will be utilized. To this end, when referencing a particular coordinate plane without reference to the position of the plane along a third coordinate axis, the term is to be understood to include a plurality of planes having different values for the third coordinate axis.

Referring again to FIG. 3, the mass filter unit 35 of this embodiment includes an ion selection chamber, shown generally at 95, having an ion inlet 100 lying in a first plane 102 and an ion outlet 105 lying in a second plane 107. More particularly, ion inlet 100 and ion outlet 105 each lie in the x-y coordinate plane at different positions along the z-axis A plurality of electrodes are disposed about a central axis 110 that extends through a central portion of the ion selection chamber 95 along the z-axis. Two electrodes 115 and 120 are employed in the illustrated embodiment, each having a planar surface facing a corresponding planar surface of the other electrode. As shown, the electrodes 115 and 120 may be in the form of a pair of opposed conductive parallel plates. The dimension d is the distance between electrodes 115 and 120 and may, for example, lie along the y-axis.

The ionizer/ion injector 30 may provide the ion beam 90 at a predetermined angle, $\theta_{init}$, with respect to the plane 102 of the ion inlet 100. In such instances, the ion beam 90 is effectively directed toward the planar face of electrode 115 (although the ion beam 90 may likewise be directed toward the planar face of electrode 120) and has motion components principally lying in the y-z plane. Substantial values for angle, $\theta_{init}$, are preferable to ensure that the mass analyzer 20 has a high m/Q resolution. For example, entrance angle, $\theta_{init}$, may have a value of at least 40° and, more preferably, a value of at least 60°.

Electrodes 115 and 120 are each connected to opposite poles of a power source, such as an RF signal generator 125. RF signal generator provides a time-dependent voltage to create a generally symmetrical varying electric field in the gap region between the electrodes 115 and 120. The magnitude of the electric field, E, between electrodes 115 and 120 with equal and opposite charge can be expressed as:

$$E=V/d \quad \text{(Equation 1)}$$

where V is the amplitude of the voltage applied by RF signal generator 125 and d is the distance between the electrodes 115 and 120 along the y-axis. For a time-varying voltage source, such as that supplied by RF signal generator 125, the electric field acting on an ion within the field at any given time, t, is given by the expression:

$$E=(V/d)\cos(\omega t-\alpha) \quad \text{(Equation 2)}$$

where V is the amplitude of the RF voltage, ω is the angular frequency, which is equal to 2π times the RF frequency, and −α is the phase of the RF voltage when the ion enters the field. The geometry of the electrodes 115 and 120 and their relative orientation gives rise to a non-rotating, oscillating electric field in ion selection chamber 95. In the illustrated embodiment, the field principally oscillates in the y-z plane and, as such, ions entering the ion selection chamber 95 are only subjected to a single electric field that oscillates in a single coordinate plane.

Applying Equation 2 to the geometry of the mass filter unit 35, the field along the y-axis as an ion moves in the direction of the z-axis is given by the expression:

$$E_y=-(V/d)\cos(\omega t-\alpha) \quad \text{(Equation 3)}$$

The minus sign accounts for the fact that the voltage, V, has been arbitrarily assigned to the top electrode 115. As such, electric field, $E_y$, will be in the negative y direction.

Ignoring fringing effects, the illustrated embodiment does not provide for an electric field along either the x or z axes. As such, only the $E_y$ field will affect the trajectory of the ions in chamber 95. To find the position of a particular ion with respect to the y-axis, the following equations may be used:

$$F=ma \text{ or } a=F/m \quad \text{(Equation 4)}$$

where F is the force acting on the ion, m is mass of the ion and a is the acceleration of the ion. More particularly, the force on an ion in an electric field can be expressed as:

$$F=QE \quad \text{(Equation 5)}$$

where Q is the charge on the ion and E is the magnitude of the electrical field. Applying the foregoing equations, the following expression for ion acceleration is derived:

$$a=d^2y/dt^2=-QE_y/m=-(QV/md)\cos(\omega t-\alpha) \quad \text{(Equation 6)}$$

Integrating Equation 6 provides the expression for the velocity of the ion along the y-axis:

$$v_y=dy/dt=-(QV/dm\omega)\sin(\omega t-\alpha)+C_1 \quad \text{(Equation 7)}$$

where $C_1$ is a constant arising from the integration. Integrating the velocity equation set forth in Equation 7, in turn, gives the y position of the ion in the electric field of the ion selection chamber 95 at time, t, and is expressed as:

$$y=(QV/dm\omega^2)\cos(\omega t-a)+C_1t+C_2 \quad \text{(Equation 8)}$$

where $C_2$ is another constant arising from the integration. Setting t=0 provides a solution for $C_1$ and $C_2$. Solving for $C_1$, the velocity in the y direction at t=0 is expressed as:

$$v_{y0}=v_0\sin(\theta_{init})=-(QV/dm\omega)\sin(-\alpha)+C_1=(QV/dm\omega)\sin(\alpha)+C_1 \quad \text{(Equation 9)}$$

As such, $$C_1=v_0\sin(\theta_{init})-(QV/dm\omega)\sin(\alpha) \quad \text{(Equation 10)}$$

where $v_0$ is the initial velocity of the ion as it enters the ion selection chamber 95 after it has been accelerated by the ionizer/ion injector 30. The term, $v_{y0}$, is the y component of that initial velocity.

Solving for $C_2$, the y position at time t=0 is expressed as:

$$y_0=(QV/dm\omega^2)\cos(-\alpha)+C_2=QV/dm\omega^2\cos(\alpha)+C_2 \quad \text{(Equation 11)}$$

As such, $$C_2=-(QV/dm\omega^2)\cos(\alpha) \quad \text{(Equation 12)}$$

Using the foregoing values to derive a single equation to express the y position of the ion as it travels along the direction of the z-axis between electrodes 115 and 120 results in the following:

$$y=(QV/dm\omega^2)\cos(\omega t-\alpha)+[v_0\sin(\theta_{init})-(QV/dm\omega)\sin(\alpha)]t-(QV/dm\omega^2)\cos(\alpha) \quad \text{(Equation 13)}$$

The position of a particular ion at time, t, along the z-axis is found by using the z component, $v_{z0}$ of the ion's initial velocity, $v_0$, and employing the time-distance equation. Velocity in the z direction at time, t=0, is expressed as:

$$v_{z0}=v_0\cos(\theta_{init}) \quad \text{(Equation 14)}$$

and, according to the time-distance equation, $$z=v_{z0}t \quad \text{(Equation 15)}$$

therefore, $$z=v_0t\cos(\theta_{init}) \quad \text{(Equation 16)}$$

where z is the distance traveled by the ion in the z direction in time, t. Ignoring fringing effects, the z component of the velocity is generally unaffected by forces in the y direction. Therefore, the electric field generated between electrodes 115 and 120 generally has no effect on the time it takes an ion to travel through the ion selection chamber 95. Further, since the motion of the ions is substantially confined to the y-z plane, knowing the values of y and z allows the plotting of the position of an ion at any time as it travels through the ion selection chamber 95. As can be noted from Equation 16, larger values for entrance angle, $\theta_{init}$, result in longer travel times of an ion through the ion selection chamber 95 for a given initial velocity, $v_0$. As such, the ion is subjected to a larger number of RF cycles for a given frequency thereby increasing the resolution of the mass filter 35.

Another unique aspect of the overall analyzer 20 is the relationship between the ion detector 40 and the outlet 105 of the ion selection chamber 95. More particularly, ion detector 40 may include an ion detection surface 130 that is arranged to principally detect ions that exit substantially at a predetermined exit angle, $\theta_e$, with respect to the plane of outlet 105 (here, the x-y plane) and to the general exclusion of ions having other exit angles. To this end, the ion detection surface 130 has a surface area that is smaller than the area of the opening of the outlet 105. Further, the ion detection surface 130 may be displaced from the longitudinal axis 110 in the ±y directions and/or spaced a distance, S, from the ion outlet 105 in the z direction. Larger values for the distance, S, are preferable since such larger values provide greater m/Q resolution than do smaller values. However, the maximum value for the distance, S, will depend on the overall size constraints placed on the analyzer 20 in specific design situations.

Since the electric field used in the illustrated embodiment lies principally in the y-z coordinate plane, the position of the ion detection surface 130 along the x-axis is substantially the same as the x-position of the incoming ion beam 90. However, the ion detection surface 130 may be displaced along the x-axis when other electric field shapes are employed to thereby take advantage of alternative exit angle orientations.

Although the position of the ion detection surface 130 may be fixed with respect to ion outlet 105, the illustrated embodiment allows the position of the ion detection surface 130 to be varied. To this end, ion detector 40 includes one or more automated actuators 135 that are connected to the ion detection surface 130 to move the ion detection surface 130 along one or more of the x, y or z axes. This allows fine tuning of the ion detection sensitivity and m/Q resolution of the analyzer 20. Further, adjustment of the ion detection surface 130 position allows the analyzer 20 to implement a wide range of analysis processes having different testing criterion. Actuator(s) 135 may be driven to place the ion detection surface 135 at the desired position by control system 45. The specific position parameters used by the control system 45 may be input as express position coordinate values through the user interface 50 or, alternatively, may be derived indirectly from other analysis parameters through system programming.

The proper position of the ion detection surface 130 under a given set of test requirements may be derived through empirical data or through direct calculation of the exit angle, $\theta_e$. The exit angle, $\theta_e$, may be found by knowing the initial velocity of the ion, $v_0$, the time that the ion passes through outlet plane 107 to exit the ion outlet 105, and the z and y components ($v_z$ and $v_y$) of the velocity of the ion at the time of exit. The time the ion spends in the field is found by solving the expression:

$$t_e = L/[v_0 \cos(\theta_{init})] \quad \text{(Equation 17)}$$

where $t_e$ is the time the ion spends in the ion selection chamber 95, L is the length of the ion selection chamber 95 and $v_0$ is the initial velocity of the ion at ion inlet 100. The denominator of the expression represents the z component, $v_{z0}$, of the initial velocity, $v_0$.

The z component of the velocity, $v_{z0}$, is constant in the illustrated embodiment since there are no substantial forces acting on the ion in the z direction during its transit through the ion selection chamber 95. However, the y component of the velocity, $v_y$, will vary and depend on the strength of the electric field in the ion selection chamber 95 at any given time and position. At time $t_e$, this may be expressed as:

$$v_{ye} = v_{y0} - [QV/dm\omega][\cos(\omega t_e - \alpha) - \cos(\alpha)] \quad \text{(Equation 18)}$$

where $v_{ye}$ is the y component of the velocity as the ion exits ion selection chamber 95 and passes through the outlet plane 107 of ion outlet 105.

Equations 17 and 18 may be combined to derive the following formulas for the exit angle, $\theta_e$:

$$\tan(\theta_e) = v_{ye}/v_z \text{ or } \theta_e = \arctan v_{ye}/v_z \quad \text{(Equation 19)}$$

therefore, $$\theta_e = \arctan([v_0 \sin(\theta_{init}) - [QV/dm\omega][\cos(\omega t_e - \alpha) - \cos(\alpha)]]/v_0 \cos(\theta_{init})) \quad \text{(Equation 20)}$$

This can be simplified by introducing the ions into the ion selection chamber 95 when the phase of the electric field at the ion inlet 100 is at $\alpha=0$. In such instances, Equation 20 simplifies to the following expression:

$$74\ _e = \arctan([v_0 \sin(\theta_{init}) - [QV/dm\omega][\cos(\omega t_e) - 1]]/v_0 \cos(\theta_{init})) \quad \text{(Equation 21)}$$

Operation of the analyzer 20 under a given set of analysis conditions (i.e., conditions in which the analysis parameters such as V, ω, α, L, d, S, etc., are constant) is illustrated in FIGS. 5 through 9. In each instance, ions entering the varying electric field of the ion selection chamber 95 are accelerated towards either electrode 115 or electrode 120, depending upon the direction of the field at the time the ion passes through the inlet plane 102 of ion inlet 100. At a given frequency, ω, ions entering the ion selection chamber 95 may experience one of the three conditions shown in FIGS. 5 through 9. Which condition an ion experiences depends on its mass, charge and velocity.

Figure 5:
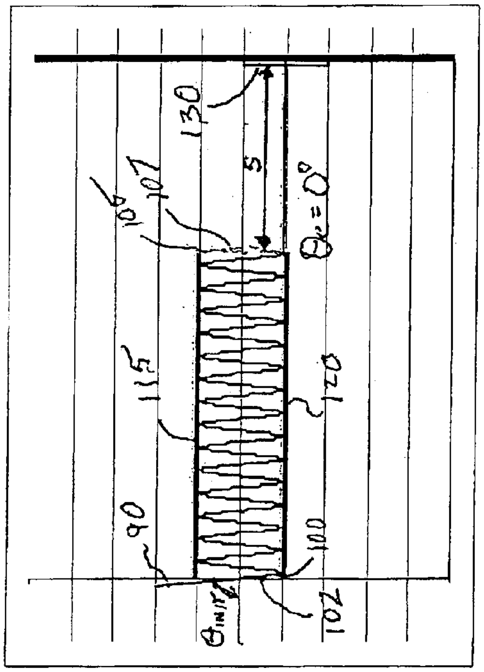
FIG. 5 illustrates the trajectory of an ion having the selected m/Q as it passes through the ion selection chamber and into contact with the ion detection surface.

With reference to FIG. 5, ions with the selected m/Q (i.e., the m/Q value that the various parameters of the analyzer 20 are set to detect) and velocity will have stable trajectories through the ion selection chamber 95. Such selected ions ultimately pass through the outlet plane 107 of ion outlet 105 at the predetermined exit angle, $\theta_e$, to impinge on the ion detection surface 130. The ion detection surface 130 has been placed precisely at a predetermined position with respect to ion outlet 105 based on the predetermined exit angle, $\theta_e$, as well as on other system design criterion (i.e., resolution, sensitivity, etc.). In the illustrated embodiment, the predetermined exit angle, $\theta_e=0°$, and the ion detection surface 130 is spaced from the x-y plane of ion outlet 105 by a distance, S. Further, it can be seen that the ion detection surface 130 is displaced from central axis 110 in the negative y direction so that a portion of the detection surface is exposed in an area above electrode 120 while another portion of the detection surface is exposed in an area below electrode 120. Given this particular configuration, an ion will travel along a stable trajectory and impact detection surface 130 whenever the acceleration provided by the electric field along the y-axis substantially cancels the y component of the initial velocity, $v_{y0}$. Under such conditions, the ion will be alternately accelerated towards and away from the electrodes 115 and 120 as the field changes magnitude and direction. The z component of the ion's velocity, $v_z$, will carry it toward the detector 40. In the illustrated embodiment, selected ions will follow the trajectory outline shown in FIG. 5 in which the ions oscillate in the y-z plane while traveling linearly along a z-axis path that is substantially parallel to the electrodes 115 and 120.

Figure 6:
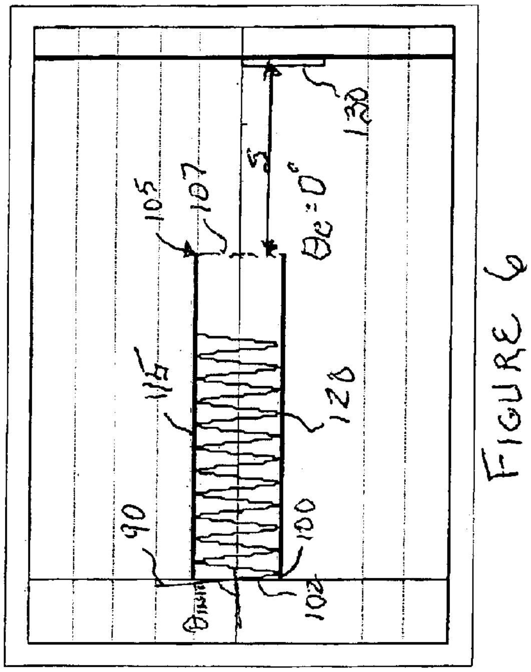
FIG. 6 illustrates the trajectory of an ion having an m/Q that is substantially above the selected m/Q.
Figure 7:
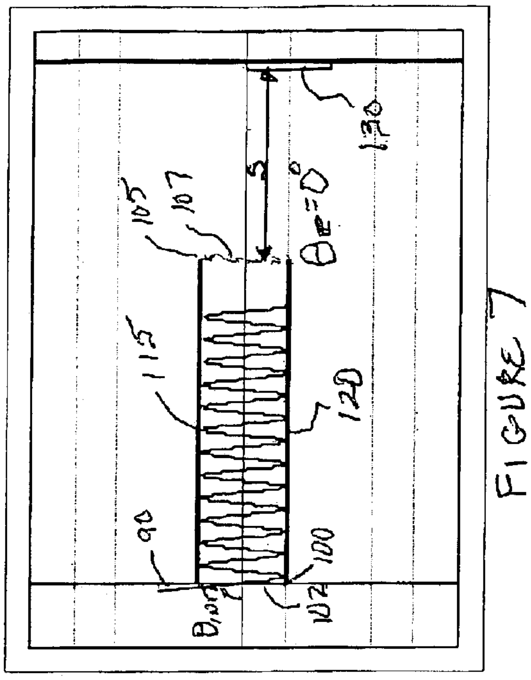
FIG. 7 illustrates the trajectory of an ion having an m/Q that is substantially below the selected m/Q.

FIG. 6 illustrates the trajectory of an ion having an m/Q that is substantially above the selected m/Q while FIG. 7 illustrates the trajectory of an ion having an m/Q that is substantially below the selected m/Q. In each instance, the ions have unstable trajectories and cannot pass through the ion selection chamber 95 before contacting one of the electrodes 115 and 120. As shown, such ions have a trajectory outline that is significantly tilted with respect to the z-axis and to electrodes 115 and 120.

Figure 8:
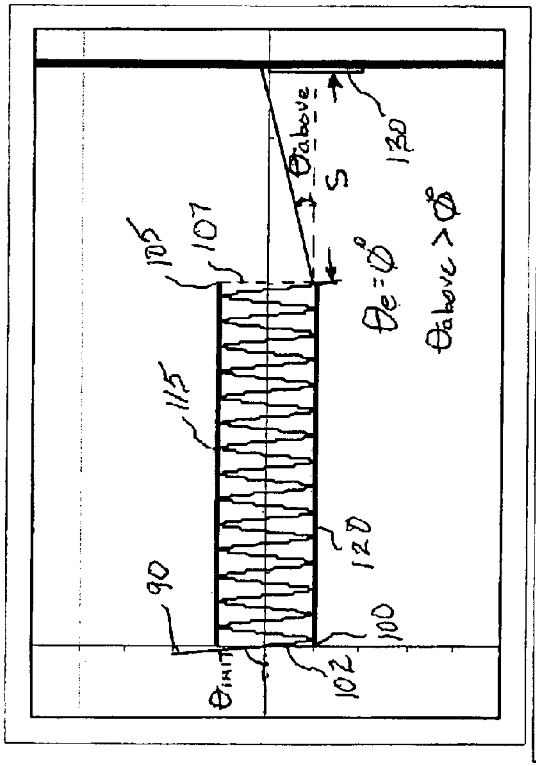
FIG. 8 illustrates the trajectory of an ion having an m/Q that is slightly above the selected m/Q.
Figure 9:
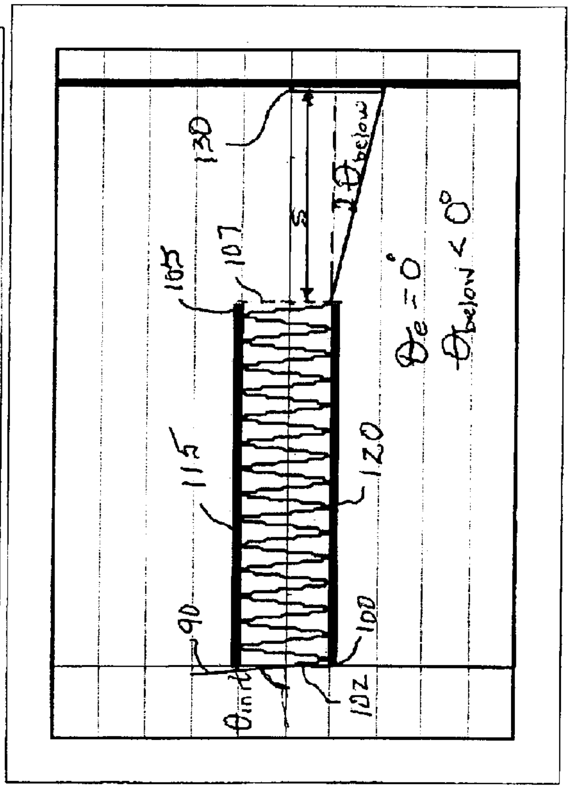
FIG. 9 illustrates the trajectory of an ion having an m/Q that is slightly below the selected m/Q.

FIG. 8 illustrates the trajectory of an ion that has an m/Q that is only slightly above the selected m/Q while FIG. 9 illustrates the trajectory of an ion having an m/Q that is only slightly below the selected m/Q. As illustrated, such ions may still pass through the ion selection chamber 95 but will miss the ion detection surface 130 because they each follow a slightly different trajectory than selected ions and pass through the outlet plane 107 of ion outlet 105 at angles, $\theta_{above}$ and $\theta_{below}$, respectively, that are different from the predetermined exit angle, $\theta_e$. The ion detection arrangement of the illustrated embodiment takes advantage of this property of ion motion and significantly increases the resolution of the analyzer 20. To this end, it will be recognized that the resolution of the analyzer 20 is indirectly proportional to the area of detection surface 130 and is directly proportional to the distance, S.

In practice, the RF voltage, V, is held constant and the mass spectrum for a sample is obtained by scanning through a set of predetermined frequencies, ω, with the RF signal generator 125. Generally stated, frequencies in the several hundreds of kilohertz range may be used with voltages in the several hundreds of volts range also being usable. Frequency scanning may be placed under the control of control system 45. At each frequency, ω, only ions within a selected m/Q range will follow the stable trajectory shown in FIG. 5. The parameters of analyzer 20 should be adjusted so those ions with stable trajectories approach the electrodes 115 and 120 as closely as possible as they travel to the ion detector 40. Ions with m/Q values that are not selected at the prescribed frequency will then either crash into one of the electrodes 115 and 120 before completing their journey through the ion selection chamber 95 or, alternatively, missing the ion detection surface 130 of the detector 40. One of the parameters that may be adjusted in this regard is the entrance angle, $\theta_{initial}$. To this end, larger entrance angles, $\theta_{initial}$, are preferable to smaller entrance angles, with angles of at least 40° being desirable and angles of at least 60° or more providing even higher m/Q selectivity and resolution. Increasing the aspect ratio of the device will also result in higher resolution.

Numerous modifications may be made to the foregoing system without departing from the basic teachings thereof Although the present invention has been described in substantial detail with reference to one or more specific embodiments, those of skill in the art will recognize that changes may be made thereto without departing from the scope and spirit of the invention as set forth in the appended claims.

What is claimed is:

1. A mass analyzer comprising:

an ion selection chamber for filtering ions based on their mass-to-charge ratio, said ion selection chamber having an ion inlet lying in an inlet plane and an ion outlet lying in an outlet plane;

a plurality of electrodes disposed in said ion selection chamber between said ion inlet and said ion outlet;

an RF signal generator connected to said plurality of electrodes to produce a non-rotating, oscillating electric field in said ion selection chamber;

an ion injector coupled to said ion inlet of said ion selection chamber to inject ions into said ion selection chamber at a substantial angle with respect to the inlet plane.

2. A mass analyzer as claimed in claim 1 wherein said ion injector comprises an ionizer adapted to receive a sample substance from a liquid chromatography apparatus, said sample substance comprising at least one analyte for ionization.

3. A mass analyzer as claimed in claim 1 wherein said ion injector comprises an ionizer adapted to receive a sample substance from an electrophoresis apparatus, said sample substance comprising at least one analyte for ionization.

4. A mass analyzer as claimed in claim 1 wherein said ion injector comprises an electrospray device.

5. A mass analyzer as claimed in claim 1 wherein said ion injector comprises an ionizer that is adapted to receive a sample material from a direct insertion probe, said sample material comprising an analyte for ionization.

6. A mass analyzer as claimed in claim 1 wherein said ion injector comprises an ionizer that is adapted to receive a sample material from a capillary column, said sample material comprising an analyte for ionization.

7. A mass analyzer as claimed in claim 1 wherein said ion injector comprises an ionizer that is adapted to generate ions of an analyte using a matrix-assisted laser desorption/ionization process.

8. A mass analyzer as claimed in claim 1 wherein said ion injector comprises an ionizer that is adapted to generate ions of an analyte, using an electrospray process.

9. A mass analyzer as claimed in claim 1 wherein said plurality of electrodes comprises:

a first electrode having a planar surface; and a second electrode having a planar surface, the planar surface of said second electrode facing the planar surface of said first electrode and being generally parallel therewith.

10. A mass analyzer as claimed in claim 1 wherein the ion injector is coupled to said inlet of said ion selection chamber to inject ions into said ion selection chamber at an angle of at least 60° with respect to said inlet plane.

11. A mass analyzer as claimed in claim 1 wherein said ion injector is coupled to said inlet of said ion selection chamber to inject ions into said ion selection chamber at an angle of at least 40° with respect to said inlet plane.

12. A mass analyzer as claimed in claim 1 and further comprising an ion detection surface proximate said ion outlet of said ion selection chamber, said ion detection surface being positioned to primarily detect ions exiting substantially at a predetermined exit angle with respect to said outlet plane to the general exclusion of ions having other exit angles.

13. A mass analyzer comprising:

an ion selection chamber for filtering ions based on their mass-to-charge ratio;

a first electrode disposed in the ion selection chamber, the first electrode having a planar face;

a second electrode having a planar face, said first and second electrodes being oriented in said ion selection chamber to place the planar faces thereof parallel and opposite one another;

an RF signal generator connected to said first and second electrodes to produce a non-rotating, oscillating electric field within said ion selection chamber;

an ion injector adapted to inject ions into said ion selection chamber toward a planar face of either said first or second electrode.

14. A mass analyzer as claimed in claim 13 wherein said ion injector comprises an ionizer adapted to receive a sample substance from a liquid chromatography apparatus, said sample substance comprising at least one analyte for ionization.

15. A mass analyzer as claimed in claim 13 wherein said ion injector comprises an ionizer adapted to receive a sample substance from an electrophoresis apparatus, said sample substance comprising at least one analyte for ionization.

16. A mass analyzer as claimed in claim 13 wherein the ion injector comprises an electrospray device.

17. A mass analyzer as claimed in claim 13 wherein said ion injector comprises an ionizer that is adapted to receive a sample material from a direct insertion probe, said sample material comprising an analyte for ionization.

18. A mass analyzer as claimed in claim 13 wherein said ion injector comprises an ionizer that is adapted to receive a sample material from a capillary column, said sample material comprising an analyte for ionization.

19. A mass analyzer as claimed in claim 13 wherein said ion injector comprises an ionizer that is adapted to generate ions of an analyte using a matrix-assisted laser desorption/ionization process.

20. A mass analyzer as claimed in claim 13 wherein said ion injector comprises an ionizer that is adapted to generate ions using an electrospray process.

21. A mass analyzer as claimed in claim 13 wherein the ion injector is coupled to said inlet of said ion selection chamber to inject ions into said ion selection chamber at an angle of at least 60° with respect to said inlet plane.

22. A mass analyzer as claimed in claim 13 wherein said ion injector is coupled to said inlet of said ion selection chamber to inject ions into said ion selection chamber at an angle of at least 40° with respect to said inlet plane.

23. A mass analyzer as claimed in claim 13 and further comprising an ion detection surface proximate said ion outlet of said ion selection chamber, said ion detection surface being positioned to primarily detect ions exiting substantially at a predetermined exit angle with respect to said outlet plane to the general exclusion of ions having other exit angles.

24. A mass analyzer comprising:

an ion selection chamber for filtering ions based on their mass-to-charge ratio, said ion selection chamber having an ion inlet lying in an inlet plane, an ion outlet lying in an outlet plane that is substantially parallel to the inlet plane, and a central axis extending between and normal to the inlet and outlet planes;

a single set of parallel plate electrodes disposed in the ion selection chamber about the central axis;

an RF signal generator connected to the single set of parallel plate electrodes to produce an electric field within the ion selection chamber, said electric field oscillating substantially exclusively in a coordinate plane that is substantially perpendicular to the inlet and outlet planes;

an ion injector adapted to inject ions into the ion selection chamber so that the principal velocity components of said injected ions lie in said coordinate plane and along said oscillating electric field.

25. A mass analyzer as claimed in claim 24 wherein said ion injector comprises an ionizer adapted to receive a sample substance from a liquid chromatography apparatus, said sample substance comprising at least one analyte for ionization.

26. A mass analyzer as claimed in claim 24 wherein said ion injector comprises an ionizer adapted to receive a sample substance from an electrophoresis apparatus, said sample substance comprising at least one analyte for ionization.

27. A mass analyzer as claimed in claim 24 wherein the ion injector comprises an electrospray device.

28. A mass analyzer as claimed in claim 24 wherein said ion injector comprises an ionizer that is adapted to receive a sample material from a direct insertion probe, said sample material comprising an analyte for ionization.

29. A mass analyzer as claimed in claim 24 wherein said ion injector comprises an ionizer that is adapted to receive a sample material from a capillary column, said sample material comprising an analyte for ionization.

30. A mass analyzer as claimed in claim 24 wherein said ion injector comprises an ionizer that is adapted to generate ions of an analyte using a matrix-assisted laser desorption/ionization process.

31. A mass analyzer as claimed in claim 24 wherein said ion injector comprises an ionizer that is adapted to generate ions using an electrospray process.

32. A mass analyzer as claimed in claim 24 wherein the ion injector is coupled to said inlet of said ion selection chamber to inject ions into said ion selection chamber at an angle of at least 60° with respect to said inlet plane.

33. A mass analyzer as claimed in claim 24 wherein said ion injector is coupled to said inlet of said ion selection chamber to inject ions into said ion selection chamber at an angle of at least 40° with respect to said inlet plane.

34. A mass analyzer as claimed in claim 24 and further comprising an ion detection surface proximate said ion outlet of said ion selection chamber, said ion detection surface being positioned to primarily detect ions exiting substantially at a predetermined exit angle with respect to said outlet plane to the general exclusion of ions having other exit angles.

35. A mass analyzer comprising:

an ion selection chamber adapted to provide an electric field for selectively passing ions therethrough based on at least the mass-to-charge ratio of said ions, said ion selection chamber including an ion inlet lying in an inlet plane and an ion outlet lying in an outlet plane;

an ion injector adapted to inject ions into said electric field of said ion selection chamber, an ion detection surface disposed proximate said ion outlet of said ion selection chamber, said ion detection surface being positioned to primarily detect ions exiting substantially at a predetermined exit angle, $\theta_e$, with respect to said outlet plane to the general exclusion of ions having other exit angles.

36. A mass analyzer as claimed in claim 35 wherein said ion detection surface has a detection surface area that is substantially smaller than the area of said ion outlet of said ion selection chamber.

37. A mass analyzer as claimed in claim 35 and further comprising one or more actuators connected to drive said ion detection surface to a plurality of detection positions.

38. A mass analyzer as claimed in claim 35 wherein the ion detection surface is positioned to principally detect ions that exit at a predetermined exit angle, $\theta_e$=0°.

39. A mass analyzer comprising:

an ion injector;

an ion selection chamber for filtering ions based on their mass-to-charge ratio, said ion selection chamber adapted to receive ions from the ion injector, said ion selection chamber having an ion inlet lying in an ion inlet plane and an ion outlet lying in an ion outlet plane;

a plurality of electrodes disposed in said ion selection chamber;

an RF signal generator connected to said plurality of electrodes to generate a non-rotating, oscillating electric field in said ion selection chamber;

an ion detector disposed proximate said ion outlet of said ion selection chamber, the ion detector having a detection surface that is positioned to principally detect ions that exit substantially at a predetermined exit angle $\theta_e$ to said outlet plane of the ion outlet to the general exclusion of ions having other exit angles.

40. A mass analyzer as claimed in claim 39 wherein the ion detector comprises one or more automated drive mechanisms for moving the detection surface between a plurality of positions.

41. A mass analyzer as claimed in claim 40 wherein the one or more automated drive mechanisms move said detection surface to adjust linear spacing between said ion outlet and said detection surface.

42. A mass analyzer as claimed in claim 40 wherein the one or more automated drive mechanisms move said detection surface to adjust the angle between said ion outlet and said detection surface.

43. A mass analyzer as claimed in claim 40 wherein the one or more automated drive mechanisms move the detection surface in a direction perpendicular to the longitudinal axis of the mass filter.

44. A mass analyzer as claimed in claim 39 wherein said ion injector comprises an ionizer adapted to receive a sample substance from a liquid chromatography apparatus, said sample substance comprising at least one analyte for ionization.

45. A mass analyzer as claimed in claim 39 wherein said ion injector comprises an ionizer adapted to receive a sample substance from an electrophoresis apparatus, said sample substance comprising at least one analyte for ionization.

46. A mass analyzer as claimed in claim 39 wherein said ion injector comprises an electrospray device.

47. A mass analyzer as claimed in claim 39 wherein said ion injector comprises an ionizer that is adapted to receive a sample material from a direct insertion probe, said sample material comprising an analyte for ionization.

48. A mass analyzer as claimed in claim 39 wherein said ion injector comprises an ionizer that is adapted to receive a sample material from a capillary column, said sample material comprising an analyte for ionization.

49. A mass analyzer as claimed in claim 39 wherein said ion injector comprises an ionizer that is adapted to generate ions of an analyte using a matrix-assisted laser desorption/ionization process.

50. A mass analyzer as claimed in claim 39 wherein said ion injector comprises an ionizer that is adapted to generate ions using an electrospray process.

51. A mass analyzer as claimed in claim 39 wherein the ion injector is coupled to said inlet of said ion selection chamber to inject ions into said ion selection chamber at an angle of at least 60° with respect to said inlet plane.

52. A mass analyzer as claimed in claim 39 wherein said ion injector is coupled to said inlet of said ion selection chamber to inject ions into said ion selection chamber at an angle of at least 40° with respect to said inlet plane.

53. A mass analyzer as claimed in claim 39 wherein said plurality of electrodes comprises:

a first electrode having a planar surface; and a second electrode having a planar surface, the planar surface of said second electrode facing the planar surface of said first electrode and being generally parallel therewith.

* * * * *